United States Patent [19]

Bush et al.

[11] 4,415,417
[45] Nov. 15, 1983

[54] PHOTOPOLYMERIZATION USING COPPER IONS

[75] Inventors: Lee W. Bush, Chesterfield, Mo.; Marie S. Chan, Pittsburgh, Pa.; Gary P. Craun, Bridgeville, Pa.; William J. Erlanson, Pittsburgh, Pa.; Wood E. Hunter, Pittsburgh, Pa.; Wallace B. Ramsey, Pittsburgh, Pa.

[73] Assignee: Calgon Corporation, Pittsburgh, Pa.

[21] Appl. No.: 399,578

[22] Filed: Jul. 19, 1982

Related U.S. Application Data

[63] Continuation-in-part of Ser. No. 263,444, May 14, 1981, abandoned.

[51] Int. Cl.$^3$ .................................................. C08F 2/50
[52] U.S. Cl. .............................. 204/159.24; 526/146; 526/147
[58] Field of Search ..................... 204/159.24; 525/14; 526/146, 147

[56] References Cited

U.S. PATENT DOCUMENTS

| | | | |
|---|---|---|---|
| 2,850,445 | 9/1958 | Oster | 204/158 |
| 2,875,047 | 2/1959 | Oster | 96/35 |
| 2,875,047 | 2/1959 | Oster | 96/35 |
| 2,880,152 | 3/1959 | Hiltz et al. | 204/158 |
| 2,880,153 | 3/1959 | Hiltz et al. | 204/158 |
| 3,726,688 | 4/1973 | Rust | 96/115 P |
| 3,795,520 | 3/1974 | Nebe | 96/115 P |
| 3,926,756 | 12/1975 | Restaino | 204/159.22 |
| 4,016,334 | 4/1977 | Collins et al. | 428/463 |
| 4,140,605 | 2/1978 | Sano et al. | 204/159.12 |
| 4,222,835 | 9/1980 | Dixon | 204/159.16 |
| 4,230,766 | 10/1980 | Gaussens et al. | 428/288 |

OTHER PUBLICATIONS

J. Kosar, "Light Sensitive Systems", pp. 14–15, 1965.

*Primary Examiner*—John C. Bleutge
*Assistant Examiner*—Patricia Short
*Attorney, Agent, or Firm*—Michael C. Sudol; R. Brent Olson; Ernest V. Linek

[57] ABSTRACT

Photopolymerization of monomers by visible light using a photoreducible dye, a reducing agent and a controlled level of copper ions allows for high molecular weight polymer formation. The molecular weight is found to be proportional to the copper ion concentration. At 10 to 1,000 ppb copper ion concentration, the molecular weight of the polymer is optimum.

7 Claims, No Drawings

PHOTOPOLYMERIZATION USING COPPER IONS

This is a continuation-in-part of application U.S. Ser. No. 263,444, filed May 14, 1981, now abandoned.

BACKGROUND OF THE INVENTION

This invention relates to a visible light activated polymerization process for the production of high molecular weight polymers with the aid of copper ions.

Many processes are known in the prior art for the preparation of polymers by photopolymerization, such as those disclosed in U.S. Pat. Nos. 2,850,445; 2,880,152 and 2,880,153. These processes, however, suffer from a variety of disadvantages, such as high capital cost, low monomer conversion, high energy requirements, low polymer molecular weight formation and numerous other problems. Copending applications, U.S. Ser. No. 335,795, filed Dec. 30, 1981, and U.S. Ser. No. 155,261, filed June 2, 1980, are directed to processes using visible light activated polymerization. The improvement disclosed herein is a useful improvement of both of the described processes and they are hereby incorporated into this disclosure by reference.

The advantage of the present invention is that by the introduction of copper ions into the photopolymerization process, polymerization occurs at much lower concentration of reducing agent and photoreducible dye, thus allowing for a significant increase in the molecular weight of the product polymer.

Summary of the Invention

This invention is directed toward the preparation of polymers and copolymers with a weight average molecular weight in the range of 5 million to 15 million. The addition of a controlled amount of copper ions to a solution containing a reducing agent and a photoreducible dye may be employed to polymerize one or more ethylenically unsaturated monomers, such as acrylamide, acrylic acid, quaternary ammonium compounds or the corresponding free amine, such as methacryloyloxyethyl trimethyl ammonium methylsulfate, methacrylamido-3-propyl trimethyl ammonium chloride, 3-acrylamido-3-methyl butyl trimethyl ammonium chloride, 3-acrylamido-3-methyl propyl trimethyl ammonium chloride, diallyldimethylammonium chloride, or 2-acrylamido-2-methyl propane sulfonic acid. The process may be used to prepare the free acid or the water-soluble salts of any of the aforementioned monomers.

Thus, there is provided an improvement in the method of polymerization for preparing polymers and copolymers of ethylenically unsaturated monomers which includes the passage of visible light through a reaction mixture containing at least one monomer, a photoreducible dye and a reducing agent at a sufficient intensity and for sufficient time to accomplish polymerization. The improvement comprises the addition of copper ions to the solution in the concentration range of 10 to 1,000, preferably 10 to 200, parts per billion (copper). The use of copper ions allows polymerization to occur at much lower concentration of both the reducing agent and the photoreducible dye, thereby increasing the polymer weight average molecular weight from a range of 50,000 to 4 million (without copper ions) to a range of 5 million to 15 million. Conversion (yield) is directly proportional to the copper ion concentration. The molecular weight, as indicated by viscosity, is inversely proportional to the copper ion concentration. Higher levels of copper ion produce a decrease in polymer molecular weight. Critical control of copper ion concentration is required to obtain both high conversion and optimum polymer molecular weight.

DETAILED DESCRIPTION OF THE INVENTION

The polymerization process of this invention is initiated by visible light. Visible light may be defined as light having a wavelength in the range of approximately 4,000 to 7,000 Angstroms. Accordingly, any photoreducible dye and weak reducing agent may be used. Suitable photoreducible dyes include thiazines (such as methylene blue), thionine and riboflavin.

Suitable reducing agents include amines, such as triethanolamine, salts of ethylenediamine tetraacetic acid, and alcohols, such as n-butanol, propylene glycol and glycerine. The preferred system is a mixture of methylene blue and triethanolamine in a molar ratio of 0.0000025 to 1, preferably 0.0005 to 0.002.

Riboflavin was found effective as a dye in the method of the invention even in the absence of a reducing agent. It is possible that riboflavin is both a dye and a reducing agent or that the unsaturated monomer acts as a reducing agent in the presence of riboflavin.

The polymerization process of the present invention does not require a nitrogen purge. It may be carried out in an oxygen-containing environment, such as air or in an inert gas, such as nitrogen or argon, if desired.

Suitable light intensities include those in the range of 1,000 to 10,000-foot candles, preferably 4,000 to 10,000-foot candles, and may be supplied by any suitable source, as for example, incandescent floodlights. Initiation temperatures should be in the range of 5° C. to 45° C., preferably 10° C. to 25° C., while reaction time should be in the range of 5 minutes to 120 minutes, preferably 40 minutes to 70 minutes, and pH should generally be in the range of 3.0 to 10.0, preferably 6.0 to 9.0.

The preferred copper ion is cupric in a concentration range of 10 to 1,000, preferably 10 to 200, parts per billion. At lower copper levels, conversion falls off dramatically. At higher copper concentrations, polymer molecular weight declines.

The polymers produced in accordance with the process of the present invention may be recovered by conventional means. They may be dried, partially or completely, by known techniques to produce a gel or particulate product.

It should be understood by those skilled in the art that these parameters will vary somewhat depending on the particular polymers being produced in accordance with the teachings of the present invention.

The following examples will more fully illustrate the practice of this invention. It will be readily understood that these examples should not be construed as limiting the scope of this invention in any way. They merely illustrate some of the variations possible through the practice of this invention.

A polymerization apparatus which comprises a continuous belt was adapted for photopolymerization by encasing the belt in a plywood box (12 feet long). Three rows of lights were installed in the box on 5¼ inch centers at a distance from the belt which results in a light intensity of 3,000 to 4,000-foot candles. The apparatus was equipped with cooling facilities on the underside of the belt.

EXAMPLE 1

Acrylamide (73.63 pounds) and deionized water (73.81 pounds) were charged to a 50-gallon mix tank and agitated until uniform. Analysis of the solution by flameless atomic absorption techniques showed <10 ppb copper.

Methylene blue (0.10 grams) and triethanolamine (40.86 grams) were added to the mix tank and stirred to dissolve. The solution was kept in the dark and purged with air to prevent polymerization.

The monomer mix was fed to the moving continuous belt apparatus in a fashion to give a film having a thickness of $\frac{3}{8}$ inch, while the lights were turned on and cooling was applied. As the monomer mix travelled the length of the belt, initiation was observed by an increase in temperature. The polymer which exited the belt was analyzed. Conversion was 47.9 percent and the intrinsic viscosity was 12.6 dl/g in 1.0 N salt or a weight average molecular weight of $7.3 \times 10^6$. Although the molecular weight was acceptable, the conversion was poor.

EXAMPLE 2

Using the same procedure described in Example 1, the methylene blue charge was increased to 0.30 g and the triethanolamine level to 122.5 g. The copper level was maintained at <10 ppb. Conversion was increased to 92.5 percent and the intrinsic viscosity was 8.3 dl/g in 1.0 N salt or a weight average molecular weight of $3.9 \times 10^6$. Increasing the amount of dye to improve conversion gives an unacceptable molecular weight.

EXAMPLE 3

Using the same procedure described in Example 1, the copper level of the monomer solution was increased to 50 ppb by the addition of copper sulfate. Conversion was 92 percent and the intrinsic viscosity was 14.8 dl/g in 1.0 N salt or a weight average molecular weight of $9.4 \times 10^6$.

EXAMPLE 4

Using the same procedure as described in Example 1, the copper level in the monomer solution was increased by the addition of copper sulfate as shown in Table I. It is clear that control of the copper level is critical to the production of high molecular weight polymer.

TABLE I

| Copper Level (ppb) | Conversion (%) | Intrinsic Viscosity (dl/g in 1.0 N salt) | $Mw^1$ ($\times 10^6$) |
|---|---|---|---|
| 200 | 96.8 | 12.4 | 7.1 |
| 400 | 95.5 | 11.8 | 6.6 |
| 600 | 97.5 | 11.1 | 6.0 |
| 800 | 97.4 | 11.3 | 6.2 |
| 1000 | 98.0 | 10.1 | 5.2 |
| 2000 | 97.2 | 8.6 | 4.1 |
| 5000 | 94.8 | 9.2 | 4.5 |

[1] Mw = weight average molecular weight in 1.0 N NaCl, calculated by the following equation: $[\eta] = 3.73 \times 10^{-4} \overline{Mw}\ 0.66$ (Journal of Polymer Science, XXXI, p 483, 1958).

What is claimed is:

1. In the method of polymerization for preparing polymers and copolymers of ethylenically unsaturated monomers which includes the passage of visible light through a reaction mixture containing at least one monomer, a photoreducible dye and a reducing agent at a sufficient intensity and for sufficient time to accomplish polymerization;

the improvement comprising:
adding copper ions to the solution in the concentration range of 10 to 1,000 parts per billion, thereby obtaining a product weight average molecular weight in the range of from 5 million to 15 million and obtaining a monomer conversion above 47.9 percent.

2. The method of claim 1, wherein said dye is methylene blue.

3. The method of claim 1, wherein said reductant is triethanolamine.

4. The method of claim 1, wherein said dye and reducing agent is riboflavin.

5. The method of claim 1, wherein said monomer is at least one member selected from the group consisting of acrylamide, acrylic acid, methacryloyloxyethyl trimethyl ammonium chloride, methacryloyloxyethyl trimethyl ammonium sulfate, methacrylamido-3-propyl trimethyl ammonium chloride, 3-acrylamido-3-methyl butyl trimethyl ammonium chloride, 3-acrylamido-3-methyl propyl trimethyl ammonium chloride, diallyldimethylammonium chloride and 2-acrylamido-2-methyl propane sulfonic acid, or their water-soluble salts.

6. The method of claim 1, wherein 10 to 200 parts per billion of copper ion is added.

7. The method of claim 1, wherein said monomer conversion is at least 92 percent.

* * * * *